(12) United States Patent
Maehiro

(10) Patent No.: US 7,761,512 B2
(45) Date of Patent: Jul. 20, 2010

(54) MESSAGE EXCHANGE

(75) Inventor: Kazutoyo Maehiro, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 832 days.

(21) Appl. No.: 10/186,669

(22) Filed: Jul. 2, 2002

(65) Prior Publication Data

US 2003/0018718 A1 Jan. 23, 2003

(30) Foreign Application Priority Data

Jul. 9, 2001 (JP) ............................. 2001-207540
Sep. 14, 2001 (JP) ............................. 2001-280559

(51) Int. Cl.
*G06F 15/16* (2006.01)
*H04W 4/00* (2009.01)
*A63F 9/24* (2006.01)

(52) U.S. Cl. ....................... 709/205; 709/204; 709/206; 709/227; 455/466; 345/753; 463/40

(58) Field of Classification Search ................. 709/205, 709/206, 204, 227; 345/753; 463/40; 455/466
See application file for complete search history.

(56) References Cited

U.S. PATENT DOCUMENTS

| 5,796,393 A | 8/1998 | MacNaughton et al. | |
| 6,020,884 A | 2/2000 | MacNaughton et al. | |
| 6,487,583 B1 | 11/2002 | Harvey et al. | |
| 6,564,261 B1 * | 5/2003 | Gudjonsson et al. | 709/227 |
| 6,735,615 B1 * | 5/2004 | Iwayama et al. | 709/204 |
| 6,898,411 B2 * | 5/2005 | Ziv-el et al. | 434/350 |
| 6,908,389 B1 * | 6/2005 | Puskala | 463/40 |
| 6,912,564 B1 * | 6/2005 | Appelman et al. | 709/204 |
| 6,915,138 B2 * | 7/2005 | Kraft | 455/466 |
| 6,965,870 B1 * | 11/2005 | Petras et al. | 705/14 |
| 7,359,938 B1 * | 4/2008 | Davies et al. | 709/204 |
| 2002/0021307 A1 * | 2/2002 | Glenn et al. | 345/753 |
| 2002/0035605 A1 * | 3/2002 | McDowell et al. | 709/206 |

FOREIGN PATENT DOCUMENTS

| EP | 0944003 | 9/1999 |
| JP | 7-325776 | 12/1995 |
| JP | 9-128343 | 5/1997 |

(Continued)

OTHER PUBLICATIONS

Saint-Andre, P., "Jabber FAQ", Internet Publication, May 13, 2001 (from IDS, Nov. 9, 2005).*

(Continued)

*Primary Examiner*—Philip C Lee
(74) *Attorney, Agent, or Firm*—Greenblum & Bernstein P.L.C.

(57) ABSTRACT

A message exchange method can realize a chat easily in an interface with users who are on-line using a chat window. First status information of a receiving client that will receive a message is confirmed. Then, when the receiving client is connected to a message server, a sender is asked whether chat should be carried out. A chat window is displayed in accordance with a chat instruction received from the sender, and then, the message is stored in a message log, displayed on the chat window and sent to the receiving client.

20 Claims, 11 Drawing Sheets

FOREIGN PATENT DOCUMENTS

| | | |
|---|---|---|
| JP | 2000-92153 | 3/2000 |
| JP | 2000-285046 | 10/2000 |
| JP | 2001-222498 | 8/2001 |
| WO | 98/20410 | 5/1998 |
| WO | 00/16208 | 3/2000 |
| WO | 02/15500 | 2/2002 |

OTHER PUBLICATIONS

Matsubara, A., "Enjoy an Instant Message Like Private Sense", Mac Fan Internet, vol. 5, No. 1 Japan, Dec. 1, 1999 (including partial English language translation of the same).*

"Simple Communication is a Trend. Go with Instant Message!", Internet Magazine, No. 58, Japan, Nov. 1, 1999 (including partial English language translation of the same).*

"Internet Voyager", ASCII Corp, Jan. 1, 2000, vol. 24, No. 1, p. 398-403.*

Saint-Andre, P., "Jabber FAQ", Internet Publication, May 13, 2001, (can be retrieved from <URL: http://web.archive.org/web/20010603135226/jabber.org/general/html/faq.html >).

Saint-Andre, P., "Jabber User Guide", Internet Publication, 2000, (can be retrieved from <URL:http://web.archive.org/web/20010701014127/docs.jabber.org/no-sgml/userguide/ >).

English language Abstract of JP 2001-222498.

English language Abstract of JP 2000-285046.

English language Abstract of JP7-325776.

Tateishi, N., "Internet Voyager,", ASCII, ASCII Corp., vol. 24, No. 1, pp. 398-403, Jan. 1, 2000, along with an English language abstract.

Atsushi, M. et al., "Easy for Everyone! He is also Hooked on!! Latest Real-Time Communication [Introduction to Chat, Instant Message and Bulletin Board]," Mac Fan Internet, Mainichi Communications Inc., vol. 5, No. 1, pp. 50-51, Dec. 1, 1999, along with an English language abstract.

English Language Abstract of JP 9-128343.

Matsubara, A., "Enjoy an Instant Message Like Private Sense", Mac Fan Internet, vol. 5, No. 1, Japan, Mainichi Communications Inc., Dec. 1, 1999, pp. 50-51, together with a partial English language translation of the same.

"Simple Communication is a Trend. Go with Instant Message!", Internet Magazine, No. 58, Japan, Impress corporation, Nov. 1, 1999, pp. 206-221, together with a partial English language translation of the same.

Nakamura, T., "From Making Full Use of ICQ2000a to a Technique of Speedy Transmission of File", PC Japan, vol. 5, No. 8, Japan, Softbank Publishing Inc., Aug. 1, 2000, pp. 134-138, together with a partial English language translation of the same.

English Language Abstract of JP 2000-92153.

* cited by examiner

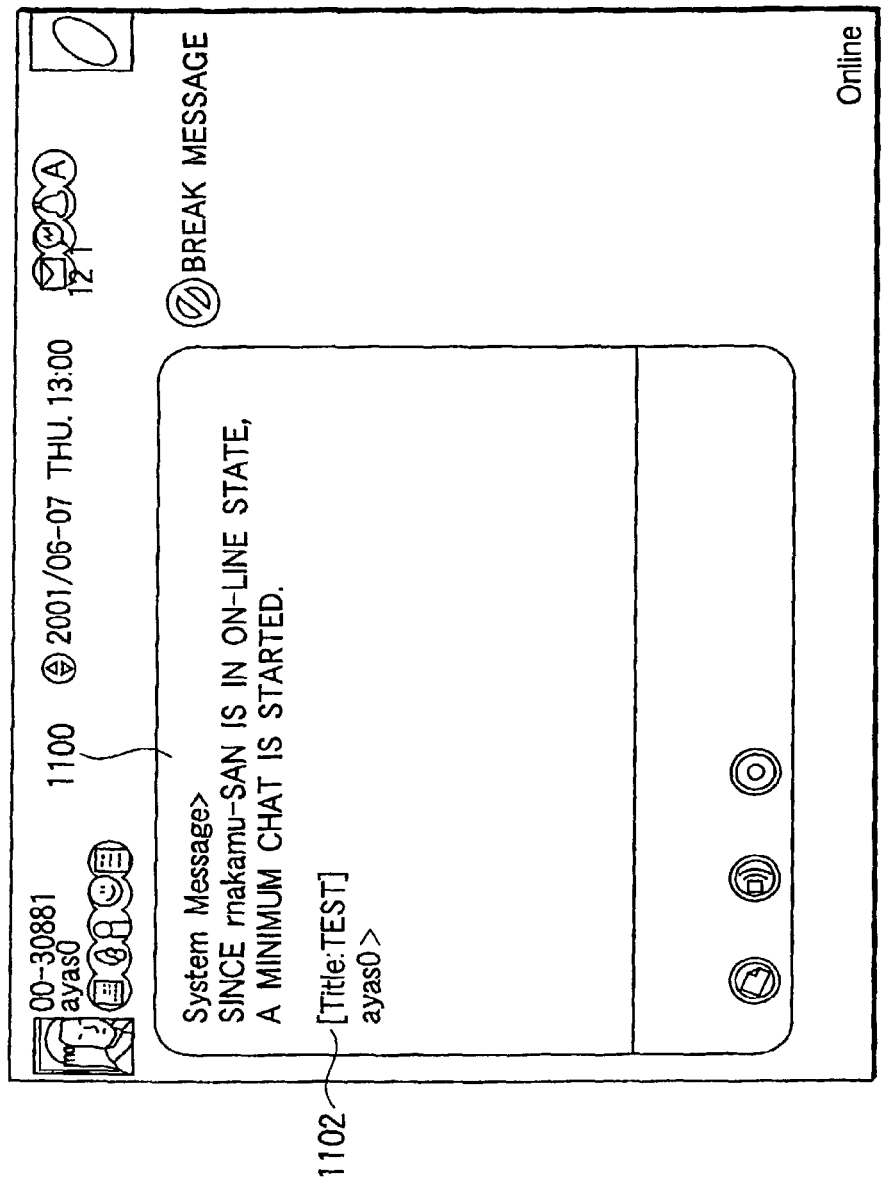

MESSAGE EXCHANGE

CROSS REFERENCE TO RELATED APPLICATION

The present disclosure relates to subject matter contained in Japanese Patent Application No. 2001-207540, filed on Jul. 9, 2001 and Japanese Patent Application No. 2001-28559, filed on Sep. 14, 2001, the disclosures of which are expressly incorporated herein by reference in their entireties.

BACKGROUND OF THE INVENTION

1. Field of the Invention

This invention relates to message exchange.

2. Description of the Related Art

When video game machines are equipped with Internet access functions, the users can enjoy various services through servers of an ASP (Application Service Provider). Exemplary new services include on-line delivery of software games and on-line network multiplayer type game distribution. To enjoy such services, users, generally, carry out user registrations to providers in advance. Based upon information registered by the user registrations, the providers manage attribute information of users and charge fees with respect to each service.

In on-line network multiplayer type games, users who enjoy games through networks may be rivals who fight against each other or may be allies who go about together. It is known that when users who become acquainted with each other have communication means, they can exchange information relating to games so that enjoyment of games can be improved. Also, when multiple participants can join in the games simultaneously in addition to joining in the one-to-one multiplayer type games, information exchange by use of an electronic conference (hereinafter referred to as chat) is useful.

Chat is carried out in such a manner that, in case that a participant accesses a chat room, i.e., send messages to a server which provides a chat service, the server broadcasts the messages to the other participants.

However, a chat service is carried out in such a manner that a user, who is registered in a server, opens a chat room according to predetermined procedures, and then, the user collects participants. Therefore, the procedures for receiving services are complicated. Also, when exchanging information using electronic mail, the mail is stored in mail boxes of a mail server and user terminals and then, delivered. Therefore, a problem exists, i.e., lack of real-time communication.

This invention is made in view of such a problem and aims to provide message exchange that can exchange a message easily and effectively.

SUMMARY OF THE INVENTION

To accomplish such objects, according to a first aspect of the invention, there is provided a message exchange method in which a message is exchanged between a sending client and a receiving client through a message server. The message exchange method includes extracting by the sending client status information of the receiving client which is intended to receive the message from a memory unit for storing status information, which indicates whether the receiving client is connected to the message server, before sending the message. The method also includes asking a sender at the sending client whether chat is to be carried out, when the extracted status information shows that the receiving client is connected to the message server. The method further includes displaying a chat window at the sending client in accordance with a chat instruction received from the sender. The method further includes storing the message in a message log contained in the memory unit at the sending client. The method further includes displaying the message on the chat window, and sending the message to the receiving client.

According to a second aspect of the invention, there is provided a message exchange method in which a message is exchanged between a sending client and a receiving client through a message server. The message exchange method includes displaying a message window at the receiving client when the message is received from the sending client. The method also includes changing the message window to a chat window at the receiving client when a receiver elects to reply to the message. The method further includes storing the message in a message log contained in the memory unit at the receiving client. The method further includes displaying the message at the receiving client on the chat window.

According to a third aspect of the invention, there is provided a message exchange system in which a message is exchanged between a sending client and a receiving client through a message server. The sending client includes a first storage that stores status information showing whether the receiving client is connected to the message server. The sending client also includes an extracting system that extracts status information of the receiving client from the storage unit before sending the message. The sending client further includes an inquiring system that asks a sender whether chat is to be carried out when the status information extracted from the extracting system shows that the receiving client is connected to the message server. The sending client further includes a first displaying system that displays a chat window in accordance with a chat instruction received from the sender. The sending client further includes a first storing system that stores a message in a message log contained in the first storage. The sending client further includes a second displaying system that displays the message on the chat window. The sending client further includes a sending system that sends the message to the receiving client.

The receiving client includes a third displaying system that displays a message window when receiving the message from the sending client. The receiving client also includes a changing system that changes the message window to a chat window when a receiver elects to reply to the message. The receiving client further includes a second storing system that stores the messages in a message log contained in a second storage at the receiving client. The receiving client further includes a fourth displaying system that displays the message at the receiving client on the chat window.

According to a fourth aspect of the invention, there is provided a sending client in which a message is exchanged with a receiving client through a message server. The sending client includes an extracting system that extracts status information about the receiving client which is intended to receive the message, from a memory for storing status information. The status information shows whether the receiving client is connected to the message server and is extracted before sending the message. The sending client also includes a inquiring system that asks a sender whether chat is to be carried out when the extracted status information shows that the receiving client is connected to the message server. The sending client further includes a first displaying system that displays a chat window in accordance with a chat instruction from the sender. The sending client further includes a first storing system that stores a message in a message log contained in the memory. The sending client further includes a second displaying system that displays the message on the chat window.

The sending client further includes a sending system that sends the message to the receiving client.

According to a fifth aspect of the invention, there is provided a receiving client in which a message is exchanged with a sending client through a message server. The receiving client includes a first displaying system that displays a message when receiving a message from the sending client. The receiving client also includes a changing system that changes the message window to a chat window when a receiver elects to reply to the message. The receiving client further includes a storing system that stores the messages in a message log contained in a storage at the receiving client. The receiving client further includes a second displaying system that displays the message at the receiving client on the chat window.

According to a sixth aspect of the invention, there is provided a computer-readable recording medium on which is recorded a program executed by a computer of a sending client. The computer exchanges a message with a receiving client through a message server. The program causes the computer to extract status information of the receiving client which receives the message, from a memory part which stores the status information showing whether the receiving client is connected to the message server before sending the message. The program also causes the computer to ask a sender whether chat is to be carried out when the extracted status information shows that the receiving client is connected to the message server. The program further causes the computer to display a chat window in accordance with a chat instruction received from the sender. The program further causes the computer to store the message in a message log contained in the memory unit. The program further causes the computer to display the memory on the chat window. The program further causes the program to send the message to the receiving client.

According to a seventh aspect of the invention, there is provided a computer-readable recording medium on which is recorded a program. The program causes the computer to display a message window when the message is received from the sending client. The program also causes the computer to change the message window to a chat window when a receiver elects to reply to the message. The program further causes the computer to store the message in a message log and display the message on the chat window.

BRIEF DESCRIPTION OF THE DRAWINGS

FIG. 11 shows a screen on which the minimum chat window is displayed in the receiving client according to an embodiment of the invention.

DETAILED DESCRIPTION OF THE PREFERRED EMBODIMENTS

Hereinafter, embodiments of the invention will be described with reference to the drawings. An embodiment provides a user interface which simulates real-time chat by displaying messages stored in a message log by use of a chat window, when exchanging a message between two people who are on-line. Such a service for providing the user interface is, hereinafter, referred to as MINIMUM CHAT. The chat window is a window that displays messages of multiple users.

Figure 1:
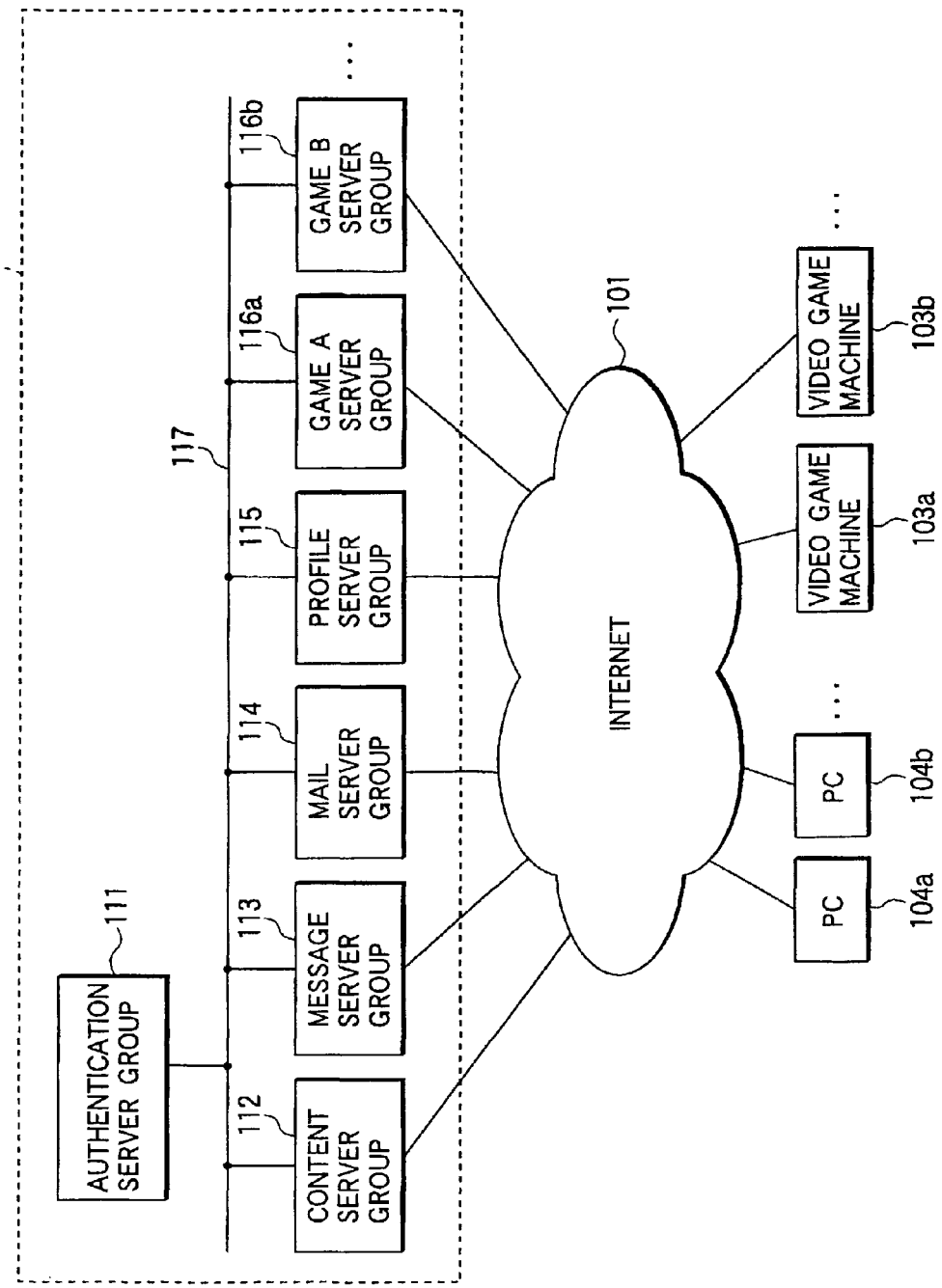
FIG. 1 shows a system that provides a message exchange method according to an embodiment of the invention.

FIG. 1 shows a system for providing message exchange according to one embodiment of the invention. Connected to an Internet 101 are server groups 102 of the ASP, video game machines 103a, 103b and multipurpose computers 104a, 104b serving as clients.

The server groups 102 of ASP includes groups of servers such as an authentication server group 111, a content server group 112, a message server group 113, a mail server group 114, a profile server 115, a game A server 116a and a game B server group 116b. The authentication server group 111 carries out account management for user authentication. The content server group 112 provides viewing services for content such as sound and motion pictures. The message server group 113 provides an environment of chat and messaging, the mail server group 114 provides an electronic mail service. The profile server group 115 manages user profiles. The game A server 116a and the game B server group 116b provide game environments. The server groups are connected via a LAN 117.

By use of such a system, a user can obtain authentication by accessing the authentication server group 111 in the server groups 102 through Internet 101 from the video game machines 103a, 103b or the multipurpose computers 104a, 104b. The server groups 102 send a menu screen to the user who has obtained authentication. When the user selects each service displayed on the menu screen, the video game machine 103a, 103b or the multipurpose computer 104a, 104b is connected to each server group according to the selected services so that the user can enjoy the services.

Figure 2:
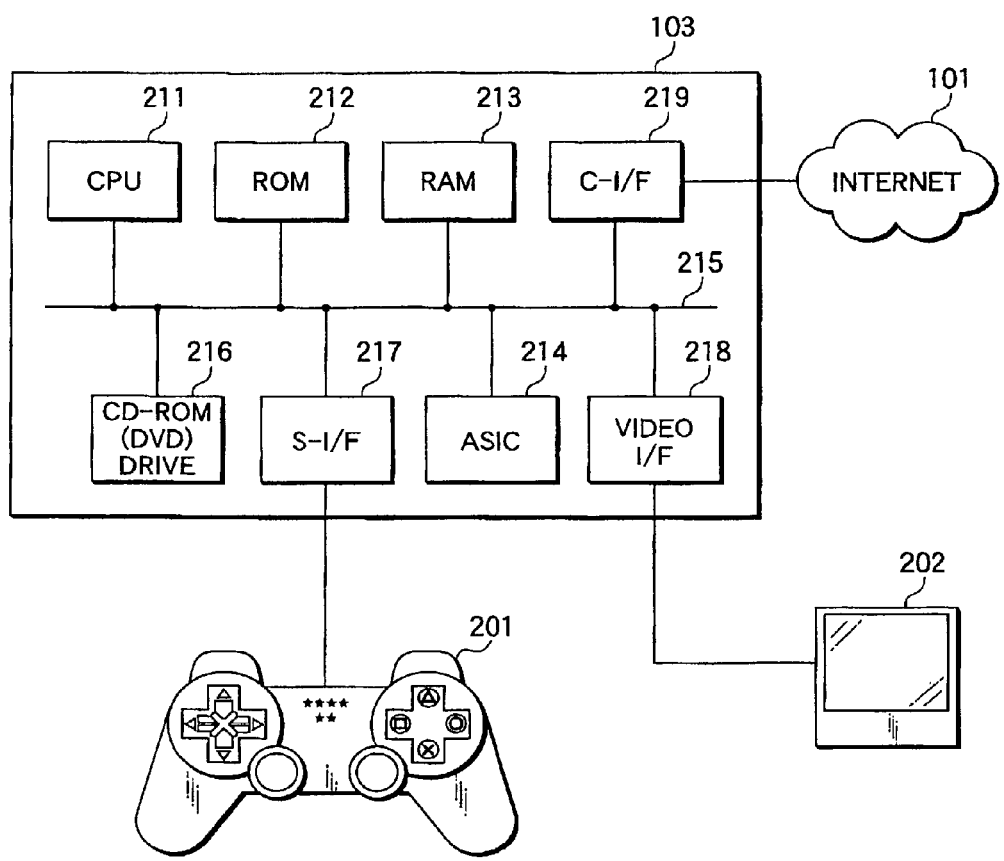
FIG. 2 is a block diagram that shows a video game machine according to an embodiment of the invention.

FIG. 2 is a block diagram that shows the video game machine implementing the message exchange according to an embodiment of the invention. Each of the video game machines 103a, 103b includes a CPU 211 which controls the overall system, a ROM 212 which stores a basic program such as a BIOS, and a RAM 213 which stores a game program and a program for carrying out processing according to an embodiment. The RAM 213 may be used as a temporary storing area. An application specific integrated circuit (ASIC) 214 carries out image processing. All components are connected via a bus 215.

Furthermore the video game machine 103a, and 103b includes a CD-ROM (DVD) drive 216, a serial interface 217, a video interface 218 and a communications interface 219.

The CD-ROM (DVD) drive 216 reads in a program from a CD-ROM that stores a game program and a program for carrying out the message exchange. The serial interface 217 is connected to a game controller 201. The video interface 218 is connected to a television monitor 202. The communications interface 219 connects to the Internet 101. All components are connected via the bus 215.

Figure 3:
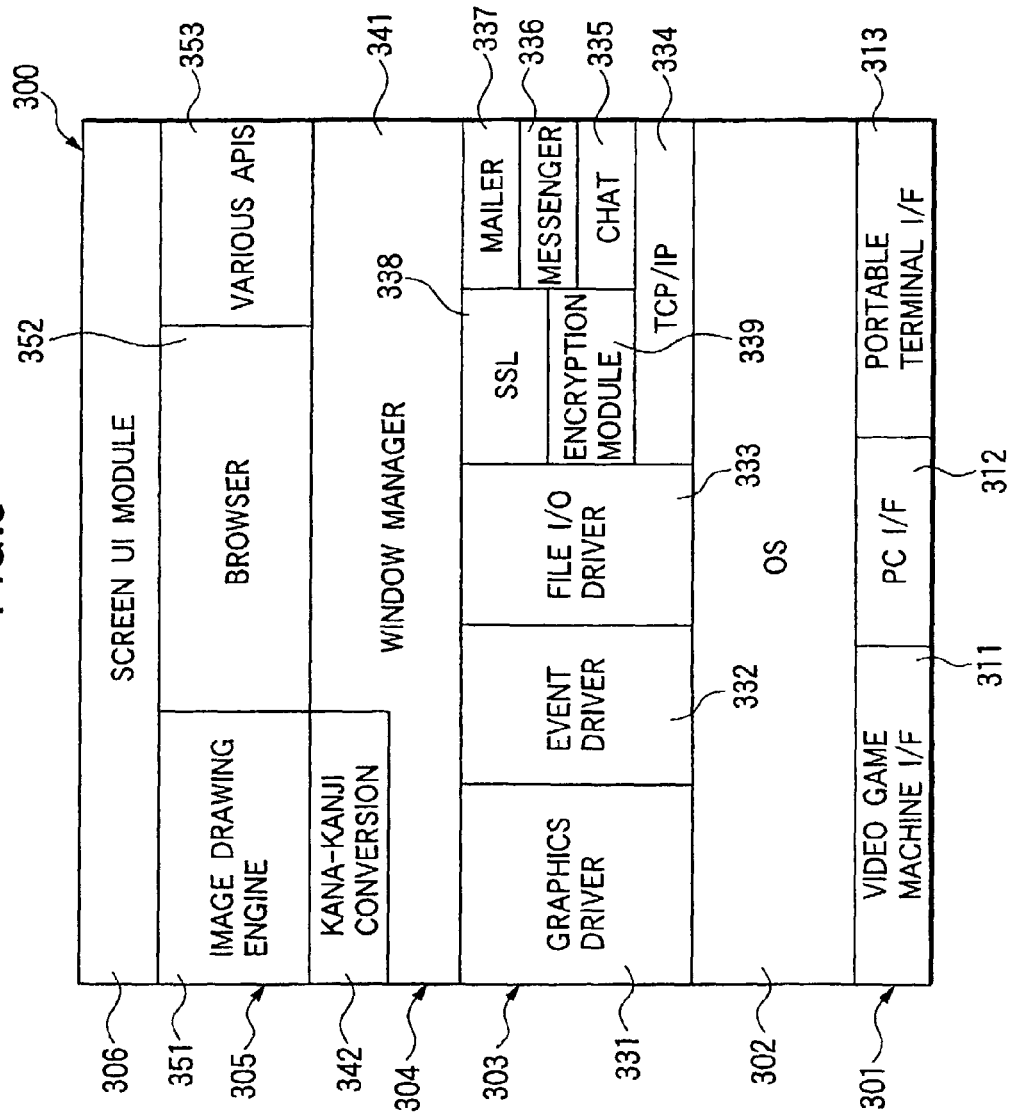
FIG. 3 shows a structure of a software module containing a program according to an embodiment of the invention.

FIG. 3 shows a software module including a program for realizing the message exchange method according to an embodiment of the invention. For example, in the video game machines 103a, 103b, the CPU 211 reads out a software module 300 through the CD-ROM drive 216 from the CD-ROM. The module is stored in the RAM 213 and is executed. Six layers from a first layer 301 to a six layer 306 make up the software module.

The first layer 301 is a physical interface and includes a video game machine IF 311, a multipurpose computer IF 312 or a portable terminal IF 313, depending on hardware. A second layer 302 is an operating system.

A third layer 303 includes various drivers, communication protocols and so on. The drivers include a graphics driver 331 an event driver 332 and a file I/O driver 333. The graphics driver 331 carries out lettering, line-drawing, marking out, scrolling, font setting and so on. The event driver 332 obtains events from a keypad, a keyboard, a mouse and so on. The file I/O driver 333 controls a file medium.

The communications includes TCP/IP 334 which forms an Internet layer protocol and a transport layer protocol, a chat protocol 335 serving as an application layer protocol, a messenger protocol 336 and a mailer protocol 337. Incidentally, other protocols can be used as the communications protocol. For example, UDP may be used as the transport layer protocol. Also, provided are SSL (Secure Socket Layer) 338 for assuring security for TCP/IP communications and a encryption module 339 that encodes and decodes data communicated between client and servers by use of SSL algorithms.

A fourth layer 304 includes a window manager 341 for starting various modules, managing memory resources and so on. The fourth layer 304 also includes a Kana-Kanji conversion system 342 such as FEP (Front End Processor), which system outputs Kanji (Chinese characters) candidates to Hiragana (Japanese syllabary characters) inputs.

A fifth layer 305 includes an image drawing engine 351 that draws an image made by PNG (Portable Network Graphics), GIF (Graphics Interchange Format), JPEG (Joint Photographic Experts Group), MPEG (Moving Picture Experts Group), Java (Trademark) Script and so on. The fifth layer also includes a web page browsing software 352 that analyzes a markup language such as HTML (Hyper Text Markup Language) and displays a screen in accordance with tag instructions. Various APIs (Application Programming Interfaces) 353 may be provided as interfaces for communicating with each server group.

A sixth layer 306 is a screen user interface (UI) module and a user interface module for setting a display such as various screens and dialogs.

An exchange of messages by use of the messenger protocol 336 will be explained. This message exchange is carried out by a messenger. The messenger is application software having a simplified electronic mailer function by which users registered in the authentication server group 111 communicate with one another through the messenger server group 113. The messenger is different from electronic mail in that messages are exchanged when the sending and receiving video game machines 103a, 103b or the multipurpose computers 104a, 104b are connected to the server groups 102.

Figure 4:
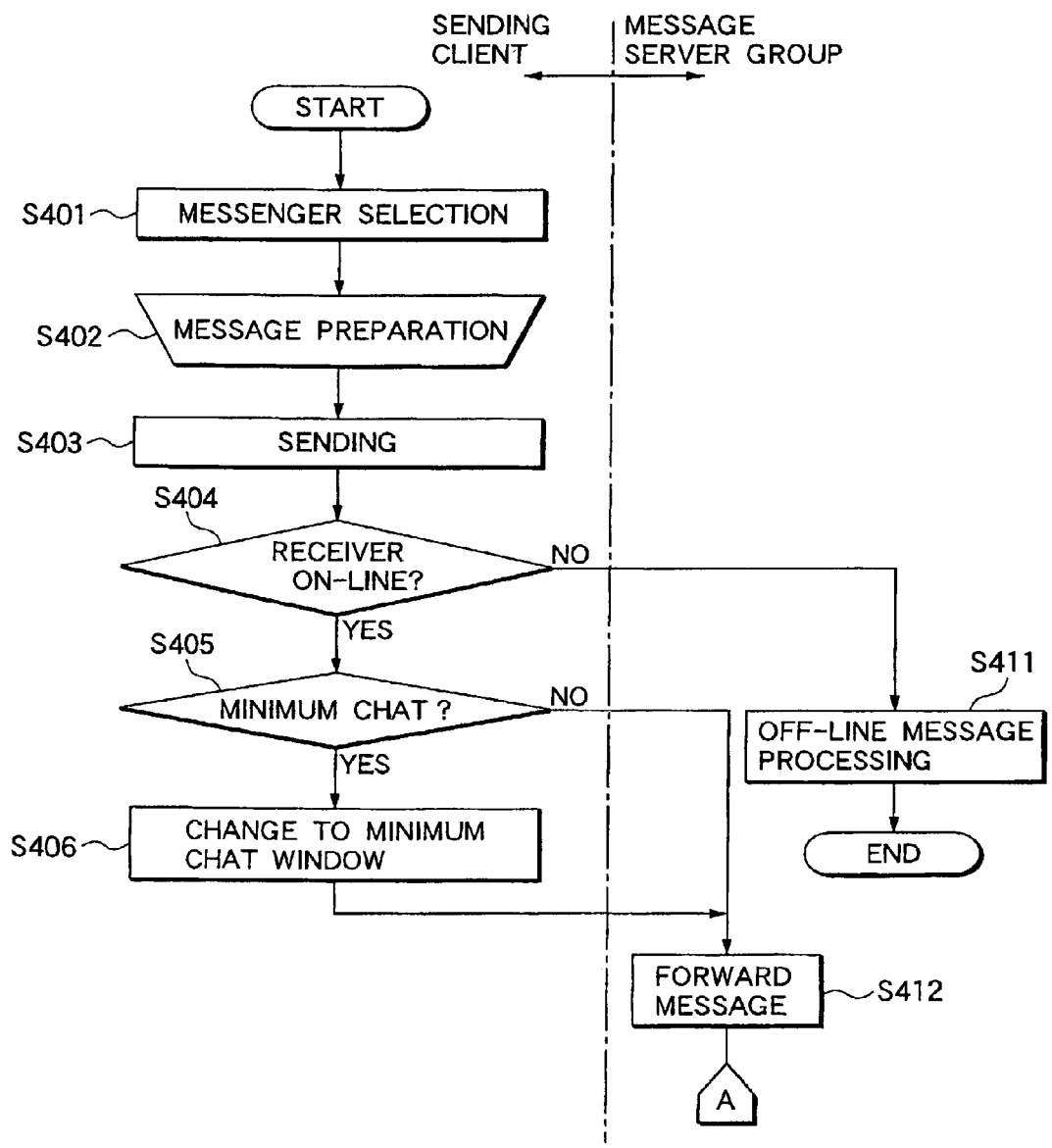
FIG. 4 is a flowchart that shows processing at a sending client according to an embodiment of the invention.

FIG. 4 is a flowchart showing processes of a sending client, according to the embodiment of the invention. A user selects a messenger in the video game machines 103a, 103b or the multipurpose computers 104a, 104b (hereinafter referred to as a client) (S401). The client accesses the message server group 113 in the server groups 102. A user prepares a message using an application of the client (S402), and instructs sending (S403). A message preparation screen will be described later by showing an example of the same in FIG. 7.

The client application, upon receiving the sending instruction, confirms whether a receiving client, which is described in the prepared message, is on-line to the server groups 102 (S404). If the receiving client is on-line, the user is asked whether MINIMUM CHAT is carried out (S405). This enables the user to easily select whether to send his/her messages or carry out MINIMUM CHAT when the user is on-line. When MINIMUM CHAT is selected, a MINIMUM CHAT window is displayed (S406) and the prepared messages are sent to the message server group 113. The details will be described later with reference to FIG. 6.

When the receiving client is on-line, regardless of whether MINIMUM CHAT is selected at the sending client, the message server group 113 simply delivers the messages from the sending client to the receiving client (S412).

On the other hand, when the receiving client, which is described in the prepared messages, is off-line, the prepared messages are sent as off-line messages to the message server group 113. The message server group 113, upon receiving the off-line messages, carries out the off-line message processing, i.e., processing for storing the received messages as the messages to the receiving client in its own memory device (S411) These messages are sent from the message server group 113 to the receiving client, when the receiving client is on-line. As stated above, based upon the state of the receiving client, a practical service for exchanging messages can be provided to sending users.

Figure 5:
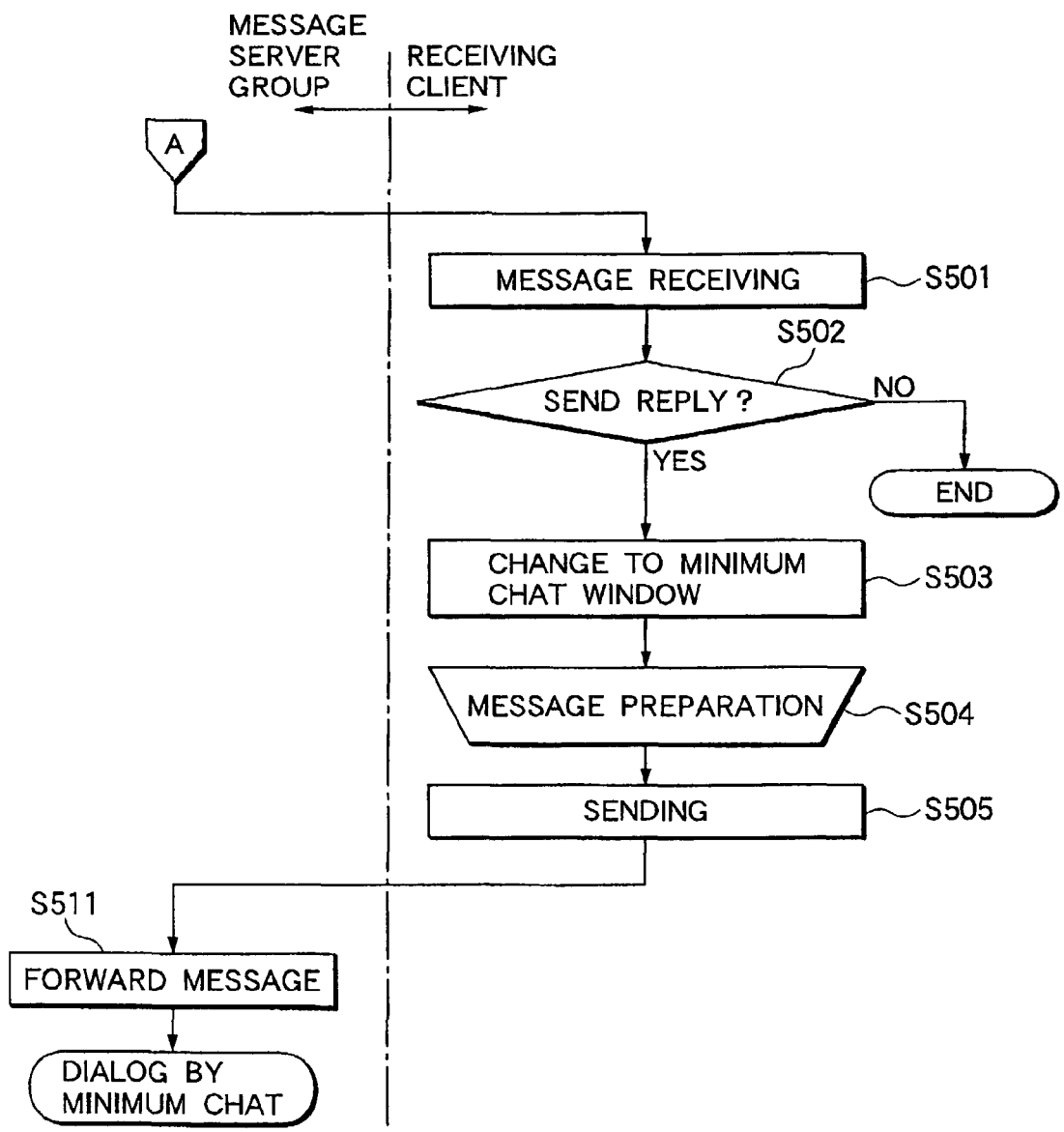
FIG. 5 is a flowchart that shows processing at a receiving client according to an embodiment of the invention.

FIG. 5 is a flowchart that shows processing at the receiving client in the message exchange according to an embodiment of the invention. When a message is received from the sending client through the message server group 113, the receiving client informs a user of the message reception and displays the message on a message window (S501). At this time, in case that a user does not reply to the message and closes the window, the processing ends (S502).

When a reply is selected, the receiving client displays the MINIMUM CHAT window and the message received on the message window (S503). When a user prepares a reply message (S504) and instructs to send it (S505), the reply message is delivered to the sending client from the receiving client through the message server group 113 (S511). Thus, messages are exchanged in an on-line state between the sending client and the receiving client by use of the MINIMUM CHAT window. In this manner, an intention of the receiving user is properly reflected as to whether MINIMUM CHAT should be carried out.

Figure 6:
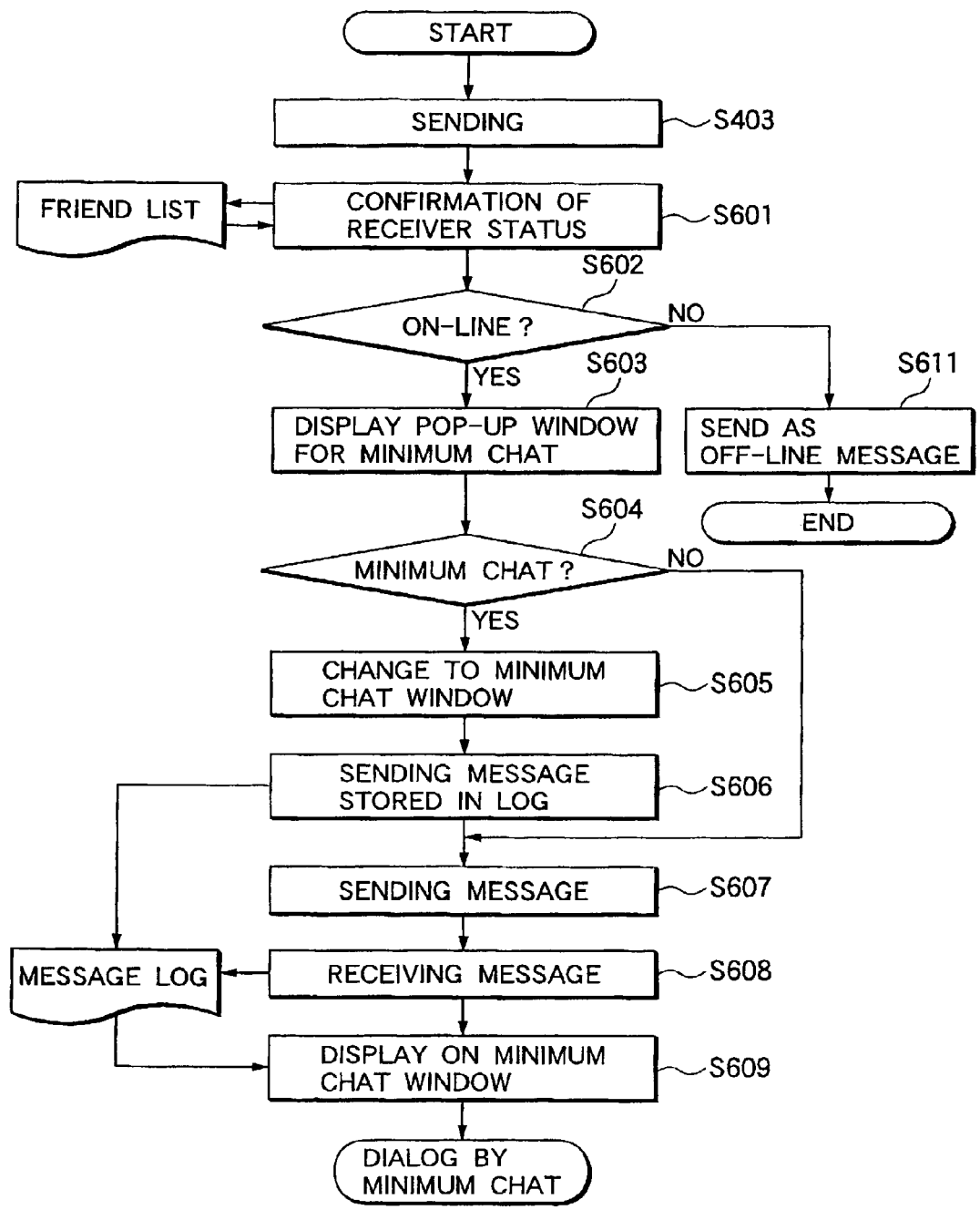
FIG. 6 is a flowchart that shows processing for changing to minimum chat in the sending client according to an embodiment of the invention.

FIG. 6 is a flowchart that shows processing for changing to MINIMUM CHAT in the sending client. The steps 404 through S406 in the flowchart shown in FIG. 4 will be described. The client application, upon receiving a sending instruction from a user, confirms whether the receiving client, which is described in the prepared message, is on-line to the server groups 102 (S601). The client stores a list of receivers (hereinafter referred to as FRIEND LIST) who send messages by use of messengers. The FRIEND LIST has flags that show whether each receiver is on-line or off-line, and updates information of such a flag by regularly querying the profile server group 115.

Figure 8:
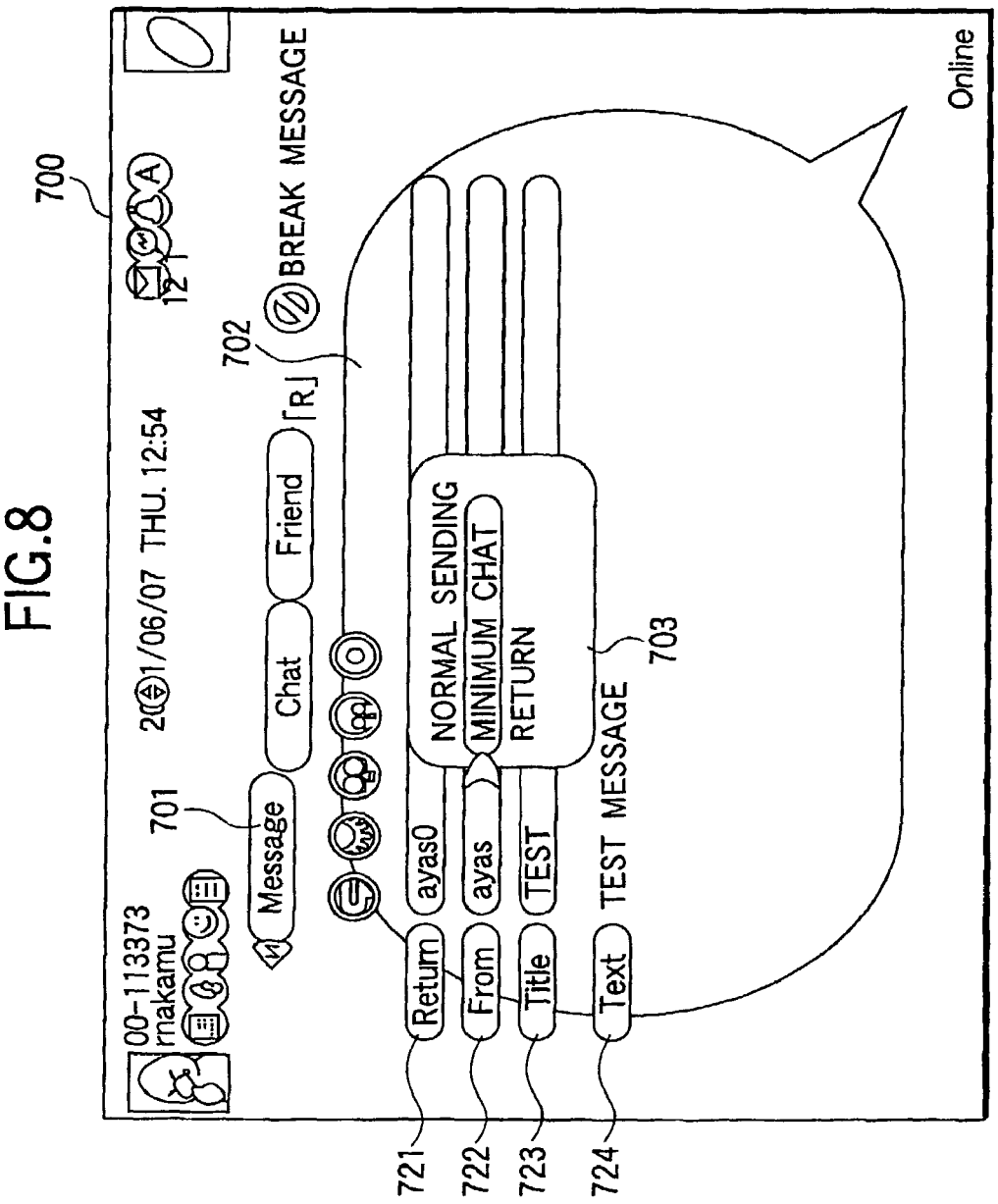
FIG. 8 shows the message preparation screen displaying a pop-up window for asking users whether minimum chat is carried out according to an embodiment of the invention.

When the corresponding receiving client is off-line (S602: NO), an off-line message is sent and the processing terminates (S611). By this, the message server group 113 stores the off-line message as a message to the receiving client in its memory device. This message is sent to the corresponding receiving client from the message server group 113 when the receiving client goes on-line. When the receiving client is on-line (S602: YES), a pop-up window is displayed (which is shown in FIG. 8 and will be described later) for querying users as to whether MINIMUM CHAT should be carried out (S603).

Figure 9:
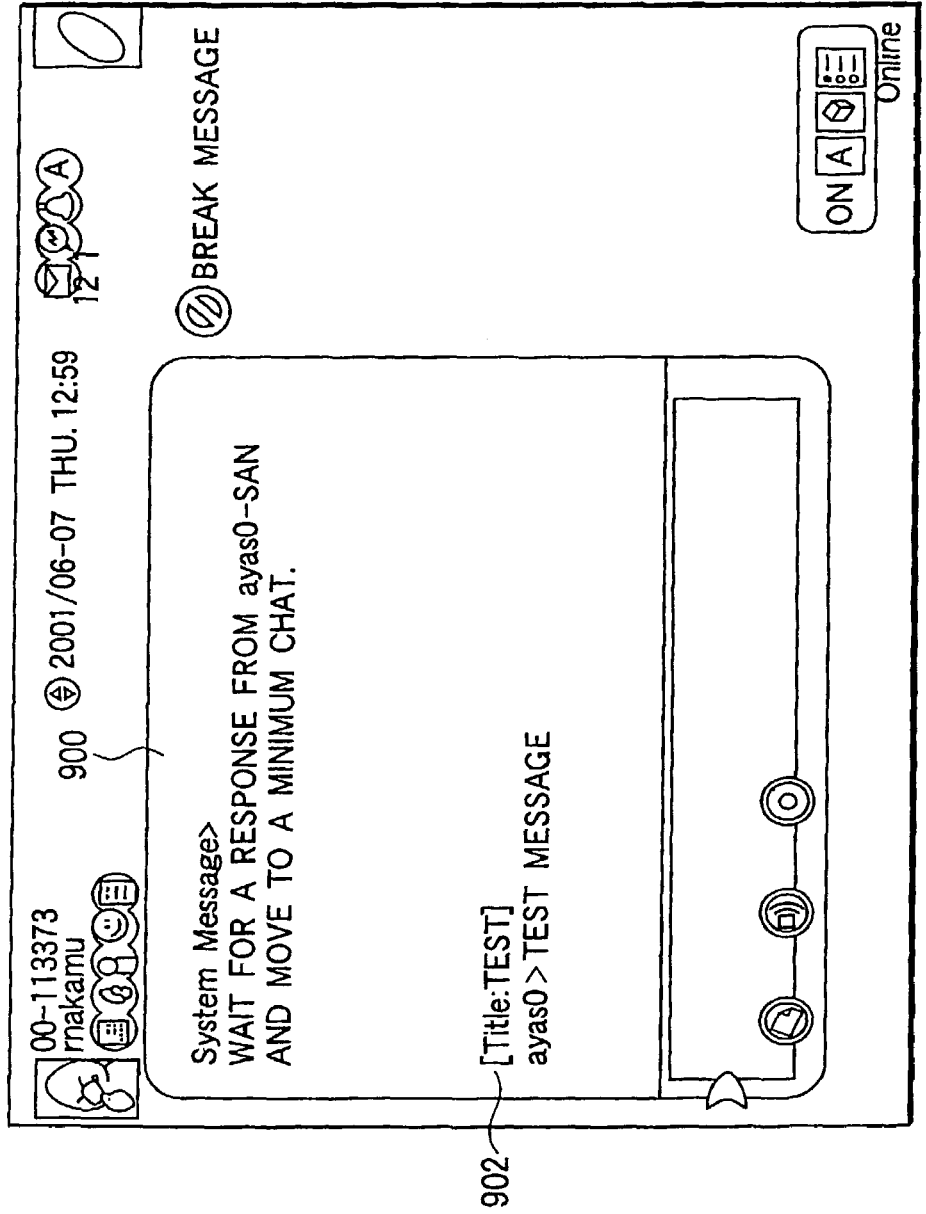
FIG. 9 shows a screen displaying a minimum chat window according to an embodiment of the invention.

When the MINIMUM CHAT is carried out (S604: YES), the client displays the MINIMUM CHAT window (S605) (which is shown in FIG. 9 and will be described later), displays the prepared message on the MINIMUM CHAT window and stores the prepared message in a message log (S606). When the MINIMUM CHAT is not carried out (S604: NO), the client sends the prepared message to the message server group 113 (S607) and waits for a reply.

The client, upon receiving a message from the receiving client, stores it in the message log (S608), and displays it based on the message log on the MINIMUM CHAT window (S609). Thus, the message is exchanged between the sending client and the receiving client who is on-line. The receiving and sending clients carry out message exchange by use of the MINIMUM CHAT window.

Figure 7:
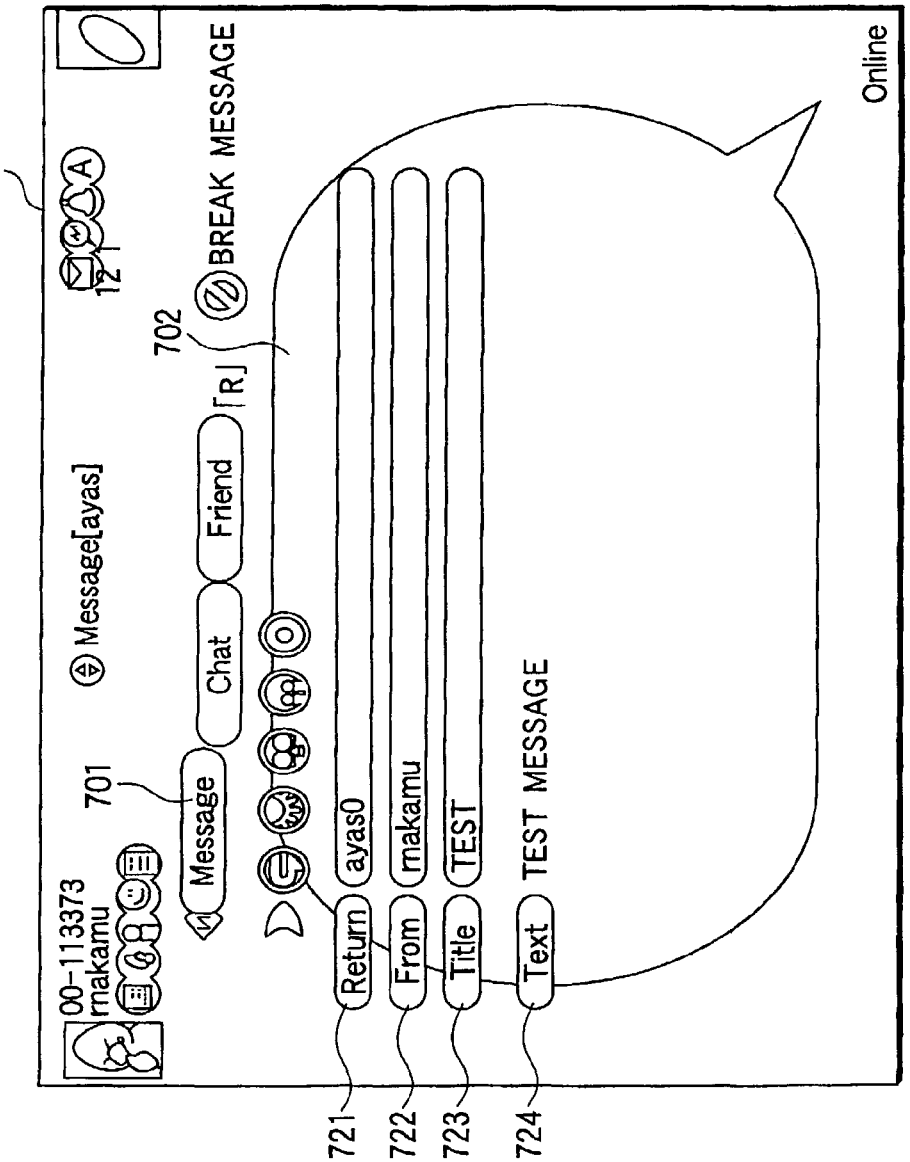
FIG. 7 shows a message preparation screen according to an embodiment of the invention.

FIG. 7 shows a message preparation screen of the message exchange, according to an embodiment of the invention. On a message preparation screen 700, when a messenger selection button 701 is pressed down, a message preparation window 702 is displayed. The message preparation window 702 includes a receiver name line 721 that identifies a client at the receiving side, and a sender name line 722 that identifies a client at the sending side. The message preparation window 702 also includes a message title line 723, and a text section 724 serving as a main body of a message. In the receiver name line 721, a receiver name, which is selected from the FRIEND LIST, is displayed.

FIG. 8 shows the message preparation screen on which is displayed a pop-up window for asking users whether MINIMUM CHAT should be carried out. The sending client refers to the FRIEND LIST and a flag of a corresponding receiver. By reference to the flag, in case that the receiving client is on-line, the client displays the pop up window 703 for asking users whether MINIMUM CHAT should be carried out.

FIG. 9 shows a screen on which is displayed a MINIMUM CHAT window of the message exchange, according to an embodiment of the invention. When the MINIMUM CHAT is selected in the pop up window 703 shown in FIG. 8, a sending client displays a screen on which a MINIMUM CHAT window 900 is displayed. The MINIMUM CHAT window 900 includes a system message section for showing chat, and a title field 902 shown a message to be sent.

Figure 10:
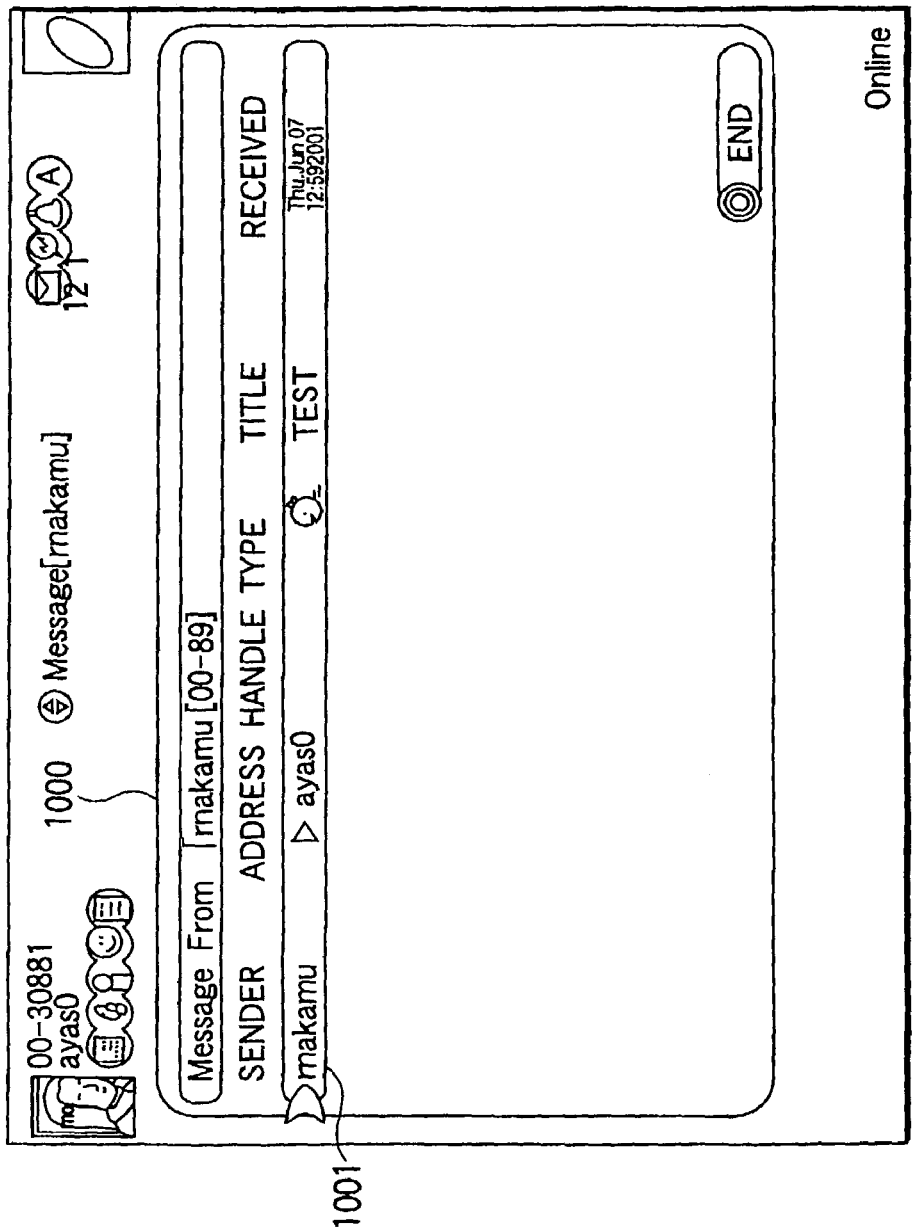
FIG. 10 shows a screen on which a received message list is displayed in the receiving client according to an embodiment of the invention.

FIG. 10 shows a screen on which a receiving message list is displayed in a receiving client. A message is received from the sending client through the message server group 113, the receiving client displays a message 1001 in the receiving message list 1000. In FIG. 10, when the message 1001 is selected, the message is displayed on the message window.

FIG. 11 shows a screen on which a MINIMUM CHAT window is displayed. In case that a reply is selected in the message window, a receiving client displays a MINIMUM CHAT window 1100 and displays a message 1102 that has been received.

The message exchange is carried out using the MINIMUM CHAT window 900 of the sending client shown in FIG. 9 and the MINIMUM CHAT window 1100 of the receiving client shown in FIG. 11. By use of the method shown in FIG. 6, the sending client and the receiving client store messages to be sent and messages to be received, in the message log, and display them in the MINIMUM CHAT window.

Of course, program code of software which realizes the message exchange can be recorded in a recording medium, and such software is read out by the video game machine or the multipurpose computer to be executed. As a recording medium for supplying program code, for example, floppy (trademark) discs, hard discs, magneto-optical discs, optical discs, CD-ROMs, CD-Rs, magnetic tapes, non-volatile memory cards, ROMs and so on can be utilized.

As described above, according to the embodiment, the message exchange can be carried out easily and effectively.

The present invention is not limited to these embodiments, but various variations and modifications may be made without departing from the scope of the present invention set forth in the claims.

What is claimed is:

1. A message exchange method in which a message is exchanged between a sending client and a receiving client, which is intended to receive the message, through a message server, the message exchange method comprising:

displaying, at the sending client, a message preparation screen;

receiving, at the sending client, a message input by a sender, the message displayed on the message preparation screen and comprising a receiving name that identifies the receiving client and a sending name that identifies the sending client;

determining, by the sending client and based on the receiving name of the message, whether the receiving client is connected to the message server by extracting status information of the receiving client from a memory that stores the status information, the status information indicating whether the receiving client is connected to the message server;

asking, by the sending client and in response to determining that the receiving client is connected to the message server, the sender at the sending client whether to carry out one of a chat with the receiving client and a normal message sending with the receiving client by displaying a pop-up window on the sending client, the pop-up window including a menu of options comprising normal sending and minimum chat;

displaying a sending client chat window at the sending client and displaying the message on the sending client chat window in accordance with a chat instruction received by the sending client from the sender;

storing the message in a sending message log contained in a memory unit at the sending client; and sending the message to the receiving client, wherein the sending client determines whether the receiving client is connected to the message server and asks the sender whether to carry out one of the chat and the normal message sending after receiving the message input by the sender and before sending the message to the receiving client and while the message is displayed on the message preparation screen.

2. The message exchange method according to claim 1, further comprising storing the message in a memory unit of the message server when the extracted status information shows that the receiving client is not connected to the message server.

3. The message exchange method of claim 1, further comprising:

displaying a message window at the receiving client when the message is received from the sending client;

changing the message window to a receiving client chat window at the receiving client when a receiver selects a reply to the message;

storing the message in a receiving message log contained in a memory unit at the receiving client; and displaying the message at the receiving client on the receiving client chat window.

4. A message exchange system in which a message is exchanged between a sending client and a receiving client through a message server, the message exchange system comprising:

the sending client comprising:

a first displayer that displays a message preparation screen;

a message receiver that receives a message input by a sender, the message being displayed on the message preparation screen and comprising a receiving name that identifies the receiving client and a sending name that identifies the sending client;

a first storage that stores status information that indicates whether the receiving client is connected to the message server;

an extractor that determines, based on the receiving name of the message, whether the receiving client is connected to the message server by extracting the status information of the receiving client from the first storage;

an inquirer that asks the sender whether to carry out one of a chat with the receiving client and a normal message sending with the receiving client by displaying a pop-up window on the sending client and in response to the extractor determining that the receiving client is connected to the message server;

a second displayer that displays a sending client chat window and displays the message on the sending chat window in accordance with a chat instruction received from the sender;

a first storage that stores the message in a sending message log contained in the first storage; and a message sender that sends the message to the receiving client, and the receiving client comprising:

a third displayer that displays a message window when receiving the message from the sending client;

a changer that changes the message window to a receiving client chat window when a receiver elects to reply to the message;

a second storage that stores the message in a receiving message log contained in the second storage at the receiving client; and a fourth displayer that displays the message at the receiving client on the receiving client chat window; and a presenter that presents the pop-up window on the sending client, the pop-up window including a menu of options comprising normal sending and minimum chat, wherein the extractor determines whether the receiving client is connected to the message server and the inquirer asks the sender whether to carry out one of the chat and the normal message sending after the message receiver receives the message input by the sender and before the message sender sends the message to the receiving client and while the message is displayed on the message preparation screen.

5. The message exchange system according to claim 4, further comprising:

a third storage that stores the message in a storage of the message server when the extracted status information indicates that the receiving client is not connected to the message server.

6. A messaging system including a sending client that exchanges a message with a receiving client, which is intended to receive the message, through a message server, comprising:

a displayer that displays a message preparation screen;

a message receiver that receives a message input by a sender, the message being displayed on the message preparation screen and comprising a receiving name that identifies the receiving client and a sending name that identifies the sending client;

an extractor that determines, based on the receiving name of the message, whether the receiving client is connected to the message server by extracting status information of the receiving client from a memory that stores the status information, the status information indicating whether the receiving client is connected to the message server;

an inquirer that asks the sender whether to carry out one of a chat with the receiving client and a normal message sending with the receiving client by displaying a pop-up window on the sending client and in response to the extractor determining that the receiving client is connected to the message server;

a first sending client displayer that displays a sending client chat window and displays the message on the sending client chat window in accordance with a chat instruction received from the sender;

a first storage that stores the message in a sending message log contained in the memory;

a message sender that sends the message to the receiving client; and a presenter that presents the pop-up window on the sending client, the pop-up window including a menu of options comprising normal sending and minimum chat, wherein the extractor determines whether the receiving client is connected to the message server and the inquirer asks the sender whether to carry out one of the chat and the normal message sending after the message receiver receives the message input by the sender and before the message sender sends the message to the receiving client and while the message is displayed on the message preparation screen.

7. The client according to claim 6, further comprising:

a second storage that stores the message in a memory of the message server when the extracted status information indicates that the receiving client is not connected to the message server.

8. The system of claim 6, further comprising the receiving client, comprising:

a first receiving client displayer that displays the message in a message window when receiving the message from the sending client;

a receiving client changer that changes the message window to a receiving client chat window when a receiver elects to reply to the message;

a receiving client storage that stores the message in a receiving message log contained in a storage at the receiving client; and a second receiving client displayer that displays the message at the receiving client on the receiving client chat window.

9. A non-transitory computer-readable recording medium on which is recorded a program executed by a computer of a sending client that exchanges a message with a receiving client, which is intended to receive the message, through a message server, the program causing the computer to execute:

displaying, at the sending client, a message preparation screen;

receiving a message input by a sender, the message being displayed on the message preparation screen and comprising a receiving name that identifies the receiving client and a sending name that identifies the sending client;

determining, based on the receiving name of the message, whether the receiving client is connected to the message server by extracting status information of the receiving client from a memory that stores the status information, the status information indicating whether the receiving client is connected to the message server;

asking, by the sending client and in response to determining that the receiving client is connected to the message server, the sender whether to carry out one of chat with the receiving client and a normal message sending with the receiving client by displaying a pop-up window on the sending client, the pop-up window including a menu of options comprising normal sending and minimum chat;

displaying a sending client chat window and displaying the message on the sending client chat window in accordance with a chat instruction received by the sending client from the sender;

storing the message in a sending message log contained in a memory unit; and sending the message to the receiving client, wherein the program causes the computer to determine whether the receiving client is connected to the message server and to ask the sender whether to carry out one of the chat and the normal message sending after receiving the message input by the sender and before sending the message to the receiving client and while the message is displayed on the message preparation screen.

10. The non-transitory computer readable recording medium according to claim 9, the program further causing the computer to execute:

storing the message in a memory of the message server in case that the extracted status information shows that the receiving client is not connected to the message server.

11. The non-transitory computer-readable recording medium of claim 9, the program further causing the computer to execute:

displaying a message window when the message is received from the sending client;

changing the message window to a receiving client chat window when a receiver elects to reply to the message;

storing the message in a receiving message log; and displaying the message on the receiving client chat window.

12. The message exchange method according to claim 1, further comprising selecting, by the sending client, a messenger for sending the message to the receiving client.

13. The message exchange method according to claim 2, further comprising sending the stored message from the memory unit of the message server when the receiving client goes on-line.

14. The message exchange system according to claim 4, further comprising a messenger that is selectable by the sending client for sending the message to the receiving client.

15. The message exchange system according to claim 5, wherein the stored message is sent from the storage of the message server when the receiving client goes on-line.

16. The messaging system according to claim 6, further comprising a messenger that is selectable for sending the message to the receiving client.

17. The message exchange method according to claim 1, wherein the sending client extracts the status information for determining whether the receiving client is connected to the message server by transmitting a sending instruction to the message server.

18. The message exchange system according to claim 4, wherein the extractor extracts the status information for determining whether the receiving client is connected to the message server by transmitting a sending instruction to the message server.

19. The messaging system according to claim 6, wherein the extractor extracts the status information for determining whether the receiving client is connected to the message server by transmitting a sending instruction to the message server.

20. The non-transitory computer-readable recording medium according to claim 9, wherein the computer extracts the status information for determining whether the receiving client is connected to the message server by transmitting a sending instruction to the message server.

* * * * *